US009007926B2

(12) United States Patent
Hou et al.

(10) Patent No.: US 9,007,926 B2
(45) Date of Patent: Apr. 14, 2015

(54) CONFIGURATION AND SCHEDULING OF ASYMMETRIC CARRIERS ON THE UPLINK

(75) Inventors: Jilei Hou, San Diego, CA (US); Danlu Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 625 days.

(21) Appl. No.: 12/722,353

(22) Filed: Mar. 11, 2010

(65) Prior Publication Data

US 2010/0238881 A1   Sep. 23, 2010

Related U.S. Application Data

(60) Provisional application No. 61/160,832, filed on Mar. 17, 2009.

(51) Int. Cl.
| | | |
|---|---|---|
| H04L 12/26 | (2006.01) | |
| H04W 52/24 | (2009.01) | |
| H04W 52/12 | (2009.01) | |
| H04W 72/08 | (2009.01) | |

(52) U.S. Cl.
CPC ............ *H04W 52/241* (2013.01); *H04W 52/12* (2013.01); *H04W 72/08* (2013.01)

(58) Field of Classification Search
None
See application file for complete search history.

(56) References Cited

U.S. PATENT DOCUMENTS

| | | | |
|---|---|---|---|
| 2002/0119796 A1* | 8/2002 | Vanghi | 455/522 |
| 2004/0258035 A1* | 12/2004 | Fan et al. | 370/342 |
| 2006/0099913 A1 | 5/2006 | Nilsson et al. | |
| 2007/0141995 A1 | 6/2007 | Youn et al. | |
| 2008/0039129 A1* | 2/2008 | Li et al. | 455/522 |
| 2008/0299985 A1 | 12/2008 | Yang et al. | |
| 2009/0088178 A1* | 4/2009 | Jugl et al. | 455/453 |
| 2010/0074216 A1* | 3/2010 | Kwak et al. | 370/329 |

FOREIGN PATENT DOCUMENTS

| | | |
|---|---|---|
| WO | WO2006004968 A2 | 1/2006 |
| WO | WO2008030867 | 3/2008 |

OTHER PUBLICATIONS

Ericsson et al: "Text Proposal for DC-HSDPA assumptions and standards impact" 3GPP Draft; R1-082249 Text Proposal for DC-HSDPA Assumptions and Standards Impact, 3rd Generation Partnership Project (3GPP), Mobile Competence Centre; 650, Route Des Lucioles; F-06921 Sophia-Antipolis Cedex; France, vol. RAN WGI, no. Kansas City, USA; May 23, 2008, XP050110541, p. 8, paragraph 4.1-paragraph 4.2; p. 9, paragraph 4.3.1.
International Search Report and Written Opinion—PCT/US2010/027355, International Search Authority—European Patent Office—Oct. 11, 2010.

(Continued)

*Primary Examiner* — Mohammad Adhami (74) *Attorney, Agent, or Firm* — Linda G. Gunderson (57) ABSTRACT

Systems and methods to configure and schedule asymmetric carriers on an uplink between communication devices are described herein. An access node is provided to reserve a common-channel-free carrier for communication with an access terminal. The access node may reserve the carrier for communication with the access terminal based on path loss data between the access node and the access terminal. Further, an adaptive rise-over-thermal (RoT) target may be employed for communication over any carrier.

24 Claims, 6 Drawing Sheets

(56) References Cited

OTHER PUBLICATIONS

Nokia: "UE measurement capability for dual cell operation" 3GPP Draft; R4-083080, 3rd Generation Partnership Project (3GPP), Mobile Competence Centre; 650, Route Des Lucioles; F-06921 Sophia-Antipolis Cedex ; France, no. Prague, Czech Republic; Nov. 19, 2008, XP050326274 [retrieved on Nov. 19, 2008] p. 1, line 1-line 26 p. 2, line 1-line 6 p. 3, paragraph 5.

QUALCOMM Europe: "New Interference Scenarios in LTE-Advanced" 3GPP Draft; R1-082556, 3rd Generation Partnership Project (3GPP), Mobile Competence Centre; 650, Route Des Lucioles; F-06921 Sophia-Antipolis Cedex; France, vol. RAN WG1, No. Warsaw, Poland; Jun. 25, 2008, XP050110817 [retrieved on Jun. 25, 2008] p. 1, paragraph 2.2—p. 2.

QUALCOMM Europe: "Range expansion for efficient support of heterogeneous networks" 3GPP Draft; R1-083813, 3rd Generation Partnership Project (3GPP), Mobile Competence Centre; 650, Route Des Lucioles; F-06921 Sophia-Antipolis Cedex; France, No. Prague, Czech Republic; Sep. 24, 2008, XP050317137 [retrieved on Sep. 24, 2008] p. 2, paragraph 2.2—p. 3, paragraph 2.3.

QUALCOMM Europe: "Serving cell association in heterogeneous networks" 3GPP Draft; R1-083196, 3rd Generation Partnership Project (3GPP), Mobile Competence Centre; 650, Route Des Lucioles; F-06921 Sophia-Antipolis Cedex ; France, no. Jeju; Aug. 12, 2008, XP050316625 [retrieved on Aug. 12, 2008] p. 1, paragraph 2.1.1—p. 2.

Taiwan Search Report—TW099107850—TIPO—Jan. 11, 2013.

* cited by examiner

CONFIGURATION AND SCHEDULING OF ASYMMETRIC CARRIERS ON THE UPLINK

CLAIM OF PRIORITY UNDER 35 U.S.C. §119

The present Application for Patent claims priority to Provisional Application No. 61/160,832 entitled "CONFIGURATION AND SCHEDULING OF ASYMMETRIC CARRIERS ON THE UPLINK" filed Mar. 17, 2009, which is assigned to the assignee hereof and is hereby expressly incorporated by reference herein.

BACKGROUND

1. Field

The present application relates generally to communications, and more specifically to systems and method to configure and schedule asymmetric carriers on an uplink between communication devices.

2. Background

Wireless communication systems are widely deployed to provide various types of communication (e.g., voice, data, multimedia services, etc.) to multiple users. As the demand for high-rate and multimedia data services rapidly grows, there lies a challenge to implement efficient and robust communication systems with enhanced performance. To support the enhanced performance new systems and methods for configuring and scheduling asymmetric carriers on an uplink between communication devices are needed.

SUMMARY

The systems, methods, and devices of the invention each have several aspects, no single one of which is solely responsible for its desirable attributes. Without limiting the scope of this invention as expressed by the claims which follow, some features will now be discussed briefly. After considering this discussion, and particularly after reading the section entitled "Detailed Description" one will understand how the features of this invention provide advantages that include configuration and scheduling of asymmetric carriers on an uplink between communication devices.

One embodiment of the disclosure provides a wireless communication apparatus operative in a communication network. The apparatus comprises a transceiver configured to communicate with a plurality of communication devices over at least one carrier. The apparatus further comprises a processor configured to employ an adaptive rise-over-thermal (RoT) target for communication between the transceiver and the at least one of the plurality of communication devices over the at least one carrier.

Another embodiment of the disclosure provides a wireless communication apparatus operative in a communication network. The apparatus comprises a receiver configured to receive path loss data from a plurality of communication devices. The apparatus further comprises a reservation module configured to reserve at least one common channel free carrier having a plurality of non-common channels for communicating with at least one of the plurality of communication devices. The reservation module reserves the carrier for the at least one of the plurality of communication devices based at least in part on the received path loss data.

Yet another embodiment of the disclosure provides a method for communicating in a communication network. The method comprises communicating with a plurality of communication devices over at least one carrier. The method further comprises employing an adaptive rise-over-thermal (RoT) target for communication with the at least one of the plurality of communication devices over the at least one carrier.

A further embodiment of the disclosure provides a method for communicating in a communication network. The method comprises receiving path loss data from a plurality of communication devices. The method further comprises reserving at least one common channel free carrier having a plurality of non-common channels for communicating with at least one of the plurality of communication devices. The carrier is reserved for the at least one of the plurality of communication devices based at least in part on the received path loss data.

Yet a further embodiment of the disclosure provides a wireless communication apparatus operative in a communication network. The apparatus comprises means for communicating with a plurality of communication devices over at least one carrier. The apparatus further comprises means for employing an adaptive rise-over-thermal (RoT) target for communication between the communicating means and the at least one of the plurality of communication devices over the at least one carrier.

Another embodiment of the disclosure provides a wireless communication apparatus operative in a communication network. The apparatus comprises means for receiving path loss data from a plurality of communication devices. The apparatus further comprises means for reserving at least one common channel free carrier having a plurality of non-common channels for communicating with at least one of the plurality of communication devices. The reserving means reserves the carrier for the at least one of the plurality of communication devices based at least in part on the received path loss data.

Yet another embodiment of the disclosure provides a computer program product, comprising computer-readable medium. The computer-readable medium comprises code for causing a computer to communicate with a plurality of communication devices over at least one carrier. The computer-readable medium further comprises code for causing a computer to employ an adaptive rise-over-thermal (RoT) target for communication with the at least one of the plurality of communication devices over the at least one carrier.

A further embodiment of the disclosure provides a computer program product comprising computer-readable medium. The computer-readable medium comprises code for causing a computer to receive path loss data from a plurality of communication devices. The computer-readable medium further comprises code for causing a computer to reserve at least one common channel free carrier having a plurality of non-common channels for communicating with at least one of the plurality of communication devices. The carrier is reserved for the at least one of the plurality of communication devices based at least in part on the received path loss data.

DETAILED DESCRIPTION

The word "exemplary" is used herein to mean "serving as an example, instance, or illustration." Any embodiment described herein as "exemplary" is not necessarily to be construed as preferred or advantageous over other embodiments. The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), cdma2000, etc. UTRA includes Wideband-CDMA (W-CDMA) and Low Chip Rate (LCR). cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDMA, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS and LTE are described in documents from an organization named "3rd Generation Partnership Project" (3GPP). cdma2000 is described in documents from an organization named "3rd Generation Partnership Project 2" (3GPP2). These various radio technologies and standards are known in the art.

Single carrier frequency division multiple access (SC-FDMA), which utilizes single carrier modulation and frequency domain equalization is a technique. SC-FDMA has similar performance and essentially the same overall complexity as those of OFDMA system. SC-FDMA signal has lower peak-to-average power ratio (PAPR) because of its inherent single carrier structure. SC-FDMA has drawn great attention, especially in the uplink communications where lower PAPR greatly benefits the mobile terminal in terms of transmit power efficiency. It is currently a working assumption for uplink multiple access scheme in 3GPP Long Term Evolution (LTE), or Evolved UTRA.

Figure 1:
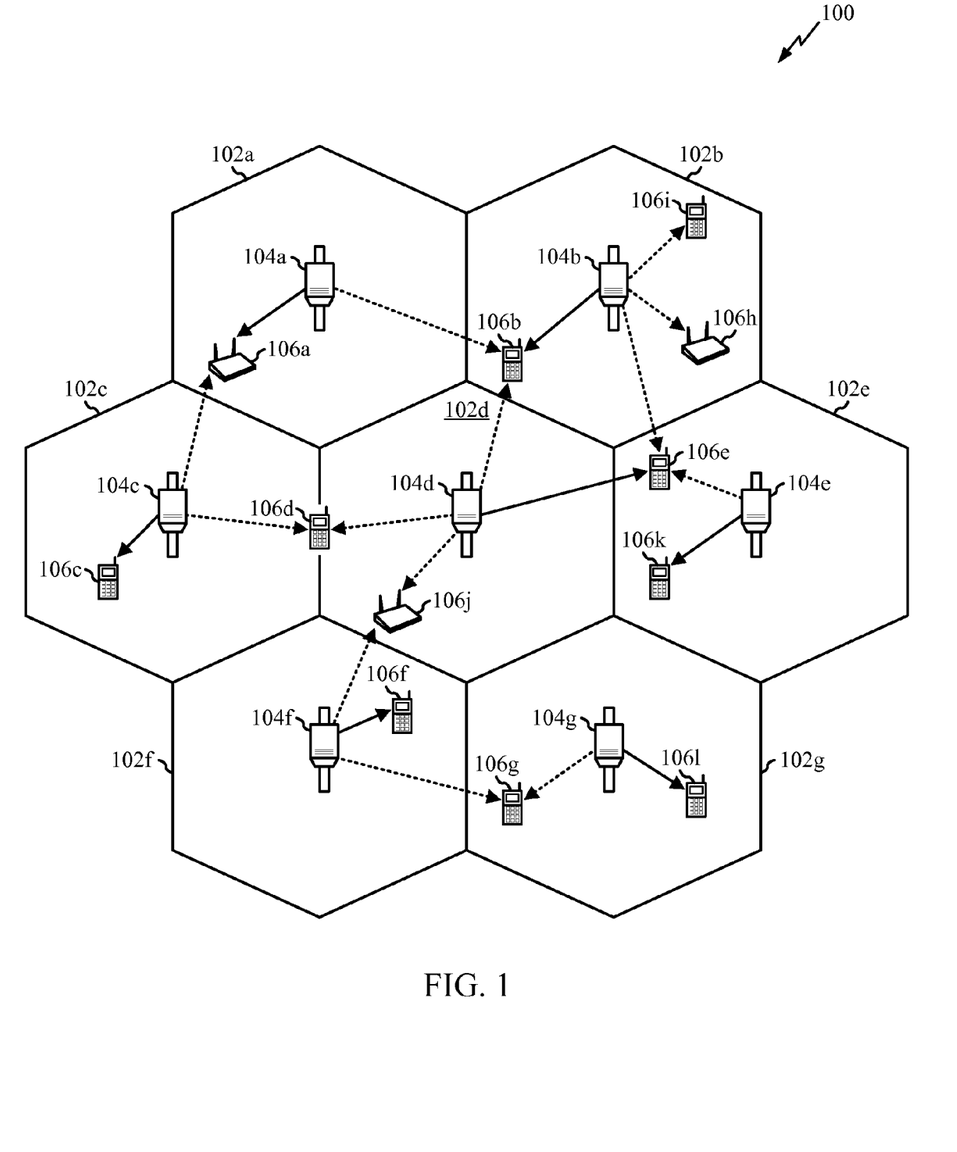
FIG. 1 illustrates an exemplary wireless communication network.

FIG. 1 illustrates an exemplary wireless communication network 100. The wireless communication network 100 is configured to support communication between a number of users. The wireless communication network 100 may be divided into one or more cells 102, such as, for example, cells 102a-102g. Communication coverage in cells 102a-102g may be provided by one or more nodes 104 (e.g., base stations), such as, for example, nodes 104a-104g. Each node 104 may provide communication coverage to a corresponding cell 102. The nodes 104 may interact with a plurality of access terminals (ATs), such as, for example, ATs 106a-106l.

Each AT 106 may communicate with one or more nodes 104 on a forward link (FL) and/or a reverse link (RL) at a given moment. A FL is a communication link from a node to an AT. A RL is a communication link from an AT to a node. The FL may also be referred to as the downlink. Further, the RL may also be referred to as the uplink. The nodes 104 may be interconnected, for example, by appropriate wired or wireless interfaces and may be able to communicate with each other. Accordingly, each AT 106 may communicate with another AT 106 through one or more nodes 104. For example, the AT 106j may communicate with the AT 106h as follows. The AT 106j may communicate with the node 104d. The node 104d may then communicate with the node 104b. The node 104b may then communicate with the AT 106h. Accordingly, a communication is established between the AT 106j and the AT 106h.

The wireless communication network 100 may provide service over a large geographic region. For example, the cells 102a-102g may cover only a few blocks within a neighborhood or several square miles in a rural environment. In one embodiment, each cell may be further divided into one or more sectors (not shown).

As described above, a node 104 may provide an access terminal (AT) 106 access within its coverage area to a communications network, such as, for example the internet or a cellular network.

An AT 106 may be a wireless communication device (e.g., a mobile phone, router, personal computer, server, etc.) used by a user to send and receive voice or data over a communications network. An access terminal (AT) may also be referred to herein as a user equipment (UE), as a mobile station (MS), or as a terminal device. As shown, ATs 106a, 106h, and 106j comprise routers. ATs 106b-106g, 106i, 106k, and 106l comprise mobile phones. However, each of ATs 106a-106l may comprise any suitable communication device.

A wireless multiple-access communication system may simultaneously support communication for multiple wireless access terminals. As mentioned above, each access terminal may communicate with one or more nodes via transmissions on the forward and reverse links. The forward link (or downlink) refers to the communication link from the node to the access terminal, and the reverse link (or uplink) refers to the communication link from the access terminal to the node. This communication link may be established via a single-in-single-out system, a multiple-in-multiple-out ("MIMO") system, or some other type of system.

A MIMO system employs multiple (NT) transmit antennas and multiple (NR) receive antennas for data transmission. A MIMO channel formed by the NT transmit and NR receive antennas may comprise NS independent channels, which are also referred to as spatial channels, where NS≤min{NT, NR}. Each of the NS independent channels corresponds to a dimension. The MIMO system may provide improved performance (e.g., higher throughput and/or greater reliability) if the additional dimensionalities created by the multiple transmit and receive antennas are utilized.

A MIMO system may support time division duplex ("TDD") and frequency division duplex ("FDD"). In a TDD system, the forward and reverse link transmissions are on the same frequency region so that the reciprocity principle allows the estimation of the forward link channel from the reverse link channel. This enables a device (e.g., a node, an access terminal, etc.) to extract a transmit beam-forming gain on the forward link when multiple antennas are available at the device.

The teachings herein may be incorporated into a device (e.g., a node, an access terminal, etc.) employing various components for communicating with at least one other device.

Figure 2:
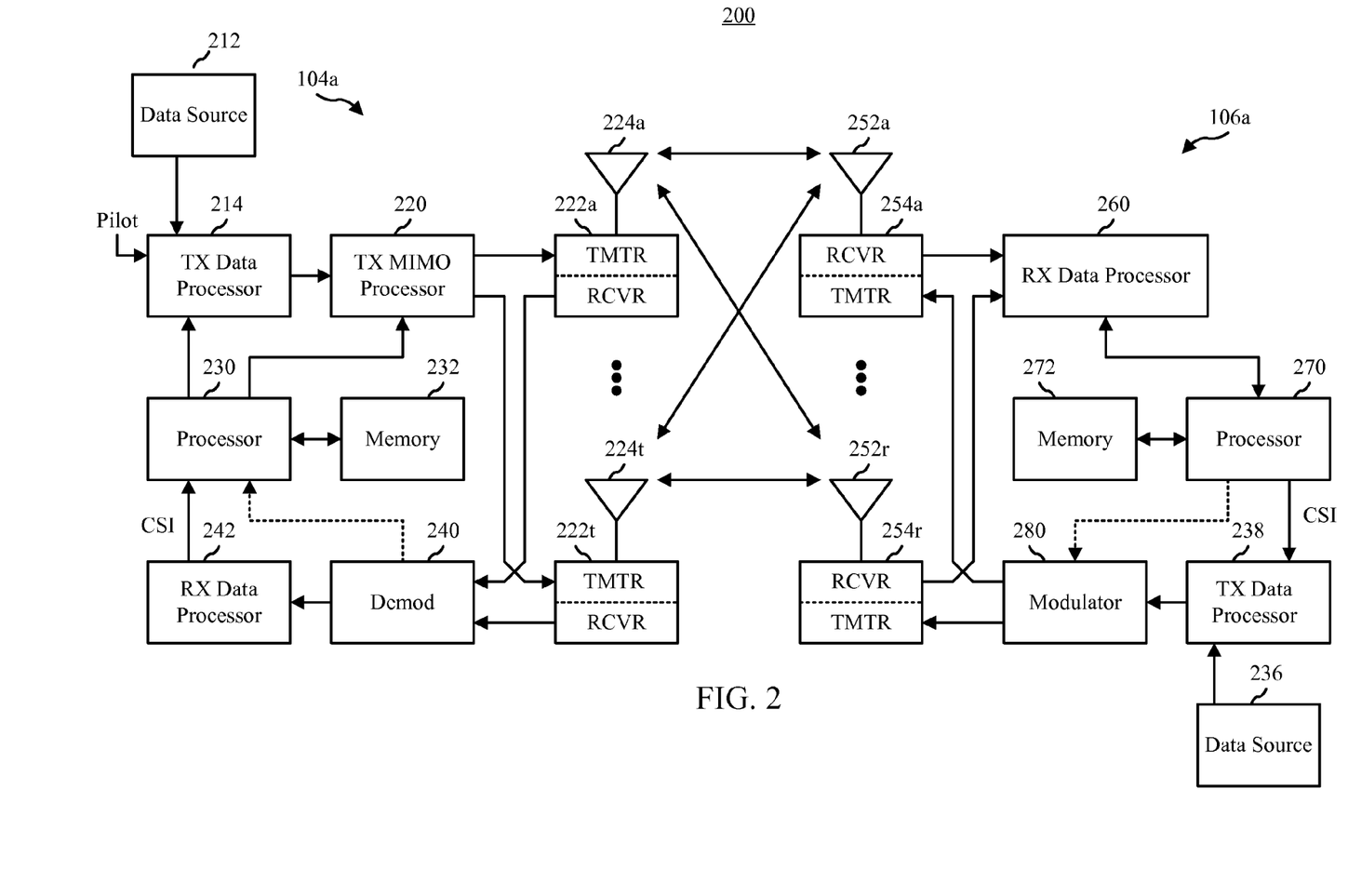
FIG. 2 illustrates functional block diagrams of an exemplary node and an exemplary access terminal shown in FIG. 1.

FIG. 2 illustrates functional block diagrams of an exemplary node 104a and an exemplary access terminal 106a shown in FIG. 1. In a MIMO system 200, the node 104a communicates with one or more ATs such as the AT 106a. At the node 104a, traffic data for a number of data streams is provided from a data source 212 to a transmit ("TX") data processor 214.

In one embodiment, each data stream is transmitted over a respective transmit antenna. The TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by a processor 230. A data memory 232 may store program code, data, and other information used by the processor 230 or other components of the node 104a.

The modulation symbols for all data streams are then provided to a TX MIMO processor 220, which may further process the modulation symbols (e.g., for OFDM). The TX MIMO processor 220 then provides NT modulation symbol streams to NT transceivers ("XCVR") 222A through 222T. In some aspects, the TX MIMO processor 220 applies beam-forming weights to the symbols of the data streams and to the antenna from which the symbol is being transmitted.

Each transceiver 222 receives and processes a respective symbol stream to provide one or more analog signals, and further conditions (e.g., amplifies, filters, and upconverts) the analog signals to provide a modulated signal suitable for transmission over the MIMO channel. NT modulated signals from transceivers 222A through 222T are then transmitted from NT antennas 224A through 224T, respectively.

At the AT 106a, the transmitted modulated signals are received by NR antennas 252A through 252R and the received signal from each antenna 252 is provided to a respective transceiver ("XCVR") 254A through 254R. Each transceiver 254 conditions (e.g., filters, amplifies, and downconverts) a respective received signal, digitizes the conditioned signal to provide samples, and further processes the samples to provide a corresponding "received" symbol stream.

A receive ("RX") data processor 260 then receives and processes the NR received symbol streams from NR transceivers 254 based on a particular receiver processing technique to provide NT "detected" symbol streams. The RX data processor 260 then demodulates, deinterleaves, and decodes each detected symbol stream to recover the traffic data for the data stream. The processing performed by the RX data processor 260 is complementary to that performed by the TX MIMO processor 220 and the TX data processor 214 at the node 104a.

A processor 270 periodically determines which pre-coding matrix to use (discussed below). The processor 270 formulates a reverse link message comprising a matrix index portion and a rank value portion. A data memory 272 may store program code, data, and other information used by the processor 270 or other components of the AT 106a.

The reverse link message may comprise various types of information regarding the communication link and/or the received data stream. The reverse link message is then processed by a TX data processor 238. The TX data processor 238 also receives traffic data for a number of data streams from a data source 236. The modulator 280 modulates the data streams. Further, the transceivers 254A through 254R condition the data streams and transmit the data streams back to the node 104a.

At the node 104a, the modulated signals from the AT 106a are received by the antennas 224. Further, the transceivers 222 condition the modulated signals. A demodulator ("DEMOD") 240 demodulates the modulated signals. A RX data processor 242 processes the demodulated signals and extracts the reverse link message (e.g., information) transmitted by the AT 106a. The processor 230 then determines which precoding matrix to use for determining the beam-forming weights. Further, the processor 230 processes the extracted message. It should be appreciated that for each node 104a and AT 106a the functionality of two or more of the described components may be provided by a single component.

As discussed above, the AT 106a may transmit data to the node 104 via an uplink. Further, the node 104 may transmit data to the AT 106a via a downlink. Each of the uplink and the downlink may comprise one or more carriers. A carrier comprises a frequency range (e.g., 850 MHz±7 MHz). A carrier of the uplink may be referred to as an uplink carrier. A carrier of the downlink may be referred to as a downlink carrier. Accordingly the AT 106a may transmit data to the node 104 over one or more uplink carriers, each carrier comprising a different frequency range. Further, the node 104 may transmit data to the AT 106a over one or more downlink carriers, each carrier comprising a different frequency range. In one embodiment, the uplink carriers comprise different frequencies than the downlink carriers. In another embodiment, the uplink and downlink carriers comprise the same frequencies.

Each downlink carrier and each uplink carrier may further comprise one or more communication channels. A channel is a logical division of the resources available for transmitting data over a carrier. For example, various techniques may be used to transmit data over a carrier such as code division multiplexing (CDM), space-division multiplexing (SDM), time-division multiplexing (TDM), etc. Each of these techniques may utilize different resources (e.g., codes, time intervals, etc.) to transmit/receive data. However, there may be a finite amount of resources available on a carrier for transmitting/receiving data. A channel, therefore, may be defined as the resources of the carrier reserved for transmitting/receiving certain types of data.

In one embodiment, the logical channels are classified into control channels and traffic channels. Control channels may comprise channels used to send control information (e.g., channel quality indication (CQI) feedback, acknowledgement/negative acknowledgement (ACK/NACK), hybrid automatic repeat request (HARD) information, uplink scheduling requests, other payload, etc.). Traffic channels may comprise channels used to send content data (e.g., audio data, video data, web packets, etc.).

The control channels may comprise one or more of: a broadcast control channel (BCCH) which is a DL channel for broadcasting system control information, a paging control channel (PCCH) which is DL channel that transfers paging information, a multicast control channel (MCCH) which is a point-to-multipoint DL channel used for transmitting multimedia broadcast and multicast service (MBMS) scheduling and control information for one or several multicast traffic channels (MTCHs), and a dedicated control channel (DCCH) which is a point-to-point bi-directional channel that transmits dedicated control information and is used by ATs having a radio resource control (RRC) connection.

The traffic channels may comprise one or more of: a dedicated traffic channel (DTCH) which is a point-to-point bi-directional channel, dedicated to one UE, for the transfer of user information; and a MTCH for point-to-multipoint DL channel for transmitting traffic data.

In one embodiment, one or more of the channels of a carrier are common channels or broadcast channels. A common channel of a carrier may be used for communication between multiple devices. For example, a common channel may be used for communication between the AN 104a and all of the ATs 106 within the cell 102a serviced by the AN 104a. Further, one or more channels of a carrier may be dedicated channels for communication between one or more ANs and a defined set of ATs that may be less than all of the ATs served by the one or more ANs. For example, a dedicated channel may be used only for communication between the AN 104a and the AT 106a.

The transmission of information over the channels of a carrier may be affected by the channel conditions on that carrier. For example, the power level used to transmit information over the channels of a carrier may be adjusted for various reasons. In one embodiment, the total received power, measured by rise-over-thermal (RoT) may be controlled on an uplink carrier between one or more ATs and an AN. The total received power may be controlled based on a link budget and system stability. The link budget may be achieved by maintaining the communication performance of a carrier for ATs on the edge of a cell. System stability may be achieved by avoiding power racing between users within one cell or across multiple cells.

ATs near the edge of a cell may experience different channel conditions than ATs that are located closer the AN serving the cell. For example, ATs near the edge of the cell 102a may receive signals from the AN 104a with a lower signal-to-noise ratio (SNR) than an AT closer to the AN 104a serving the cell 102a. This may be due to greater interference at the edge of the cell 102a from transmission from ATs and ANs of cells neighboring the cell 102a (e.g., cells 102b-102d). Since ATs from within one cell and/or across multiple cells may receive communications signals on the same carrier frequency, the signals may interfere with each other.

In order to properly interpret received signals, the ATs and/or ANs should receive the signals with a sufficient SNR. One way of increasing the received SNR of a given communication signal is to transmit the signal with greater power from the source. However, the communication signal may interfere with other communication signals sent over the same carrier frequency, and thus adversely affect the SNR of the other communication signals where the other communication signals are received. For example, the AT 106a and the AT 106b may both be in the cell 102a. Further, each may utilize a common channel of a first carrier frequency used by all ATs communicating with the AN 104a to communicate with the AN 104a. Accordingly, transmissions from the AT 106a may act as interfering signals to transmission of AT 106b. Accordingly, the power levels used for transmissions by both the AT 106a and the AT 106b for transmissions may be controlled so that the SNR at the AN 104a of signals received from the ATs 106a and 106b are acceptable.

One method of ensuring an acceptable SNR is through tight RoT control, such as by setting a conservative RoT target for signals sent over the carrier frequency. The RoT target is the SNR upper bound at the device that receives the signals. However, a conservative RoT target may limit the amount of data or rate at which data can be transmitted. For example, by limiting the RoT target, a maximum SNR is defined. A lower SNR may require information sent to have a greater number of error correcting bits to ensure that the signal can be interpreted at the receiver. Further, the resources available for transmitting information may limit the number of bits that can be sent at a time over a carrier frequency. Accordingly, a lower SNR requires a greater number of the available resources be used to send error correcting bits. This means less content data can be transmitted, effectively lowering the rate at which content data is transmitted. In one embodiment, RoT targets may be adapted in real time depending on the set of ATs currently allocated to the carrier. Accordingly, the data rate can be adjusted to the highest possible value at any given time.

When a common channel is used on a carrier frequency, all of the ATs communicating with the AN 104a use that common channel. For example, ATs close to the AN 104a and ATs near the edge of the cell 102a may both communicate with the AN 104a over a common channel of the carrier frequency. Accordingly, the RoT target for communications between each AT and the AN 104a for all channels of the carrier frequency are set conservatively to keep communications over the carrier frequency from interfering with each other.

In one embodiment, one or more carriers may be common-channel-free carriers. The common-channel-free carriers are free of broadcast channels such as a physical random access channel (PRACH) and other common channels. The common-channel-free carriers may be uplink and/or downlink carriers. In one embodiment, the common-channel free carriers may comprise enhanced dedicated channel (E-DCH) channels. In another embodiment, the common-channel-free carriers may comprise high-speed dedicated physical control channels (HS-DPCCHs). The common-channel-free carrier may be reserved for high speed data transmissions. For example, the AT 106a may communicate data over the common-channel free carrier to the AN 104a. The AT 106a may further use another carrier comprising common channels to communicate information typically communicated over common channels.

In one embodiment, only certain ATs may be allocated to communicate over the one or more common-channel free carriers. By only selecting certain ATs to communicate over the one or more common-channel-free carriers, while excluding other ATs, higher data transfer rates over the common-channel free carrier may be achieved. For example, only ATs with ample power for high speed data may be allocated to the common-channel-free carrier. Accordingly, link budget and system stability for ATs on the cell edge that do not have ample power may not be a concern. Only the ATs allocated to the common-channel-free carrier would communicate over the particular carrier frequency, and therefore interference concerns for non-allocated ATs (e.g., ATs on the cell edge) is not a concern.

A common-channel-free carrier may further increase the benefits of adaptive RoT targets as compared to carrier with common channels. For example, by only allocating certain ATs to the common-channel free carrier, high RoTs may be used. The higher RoTs allow for a higher SNR. Accordingly, higher data rates may be achieved over the common-channel-free carrier. Further, RoT targets may be adapted in real time depending on the set of ATs currently allocated to the common-channel-free carrier. Accordingly, the data rate can be adjusted to the highest possible value at any given time. Further, techniques such as multi-user diversity scheduling wherein ATs with better instantaneous channel conditions are scheduled to transmit over the common-free-channel and transmit diversity using beamforming schemes may be used. The RoT target may be determined by using an outer-loop with inter-cell interference feedback from the ATs or the ANs.

Various methods for selecting ATs for the allocation to the common-channel-free carrier may be used. In one embodiment, selection of the ATs may be based on path loss as described below. For example, the AT 106a may transmit feedback information comprising receive path loss data of the communication path between the AT 106a and the AN 104a to the AN 104a. In one embodiment, the receive path loss data may comprise a number of non-serving down commands of a channel (e.g., an enhanced dedicated channel (E-DCH) such as an E-DCH relative grant channel (E-RGCH)), a percentage of said down commands, downlink path loss differential, aggregate power control bits, and path loss information, wherein path loss information comprises one or more of: received signal code power (RSCP), received signal strength indicator (RSSI), and/or $E_c/I_0$ (i.e., energy per chip to interference ratio). The AN 104a may allocate the common-channel-free carrier to the AT 106a based at least in part upon the received feedback. For example, if the received path loss data indicates the path loss between the AN 104a and the AN 106a is below a threshold, the AN 104a may allocate the common-channel-free carrier to the AT 106a. In one embodiment the threshold may change dynamically. For example, the threshold may change based on the receive path loss data of other ATs allocated to the common-channel-free carrier. In another embodiment, the threshold may be static.

Figure 3:
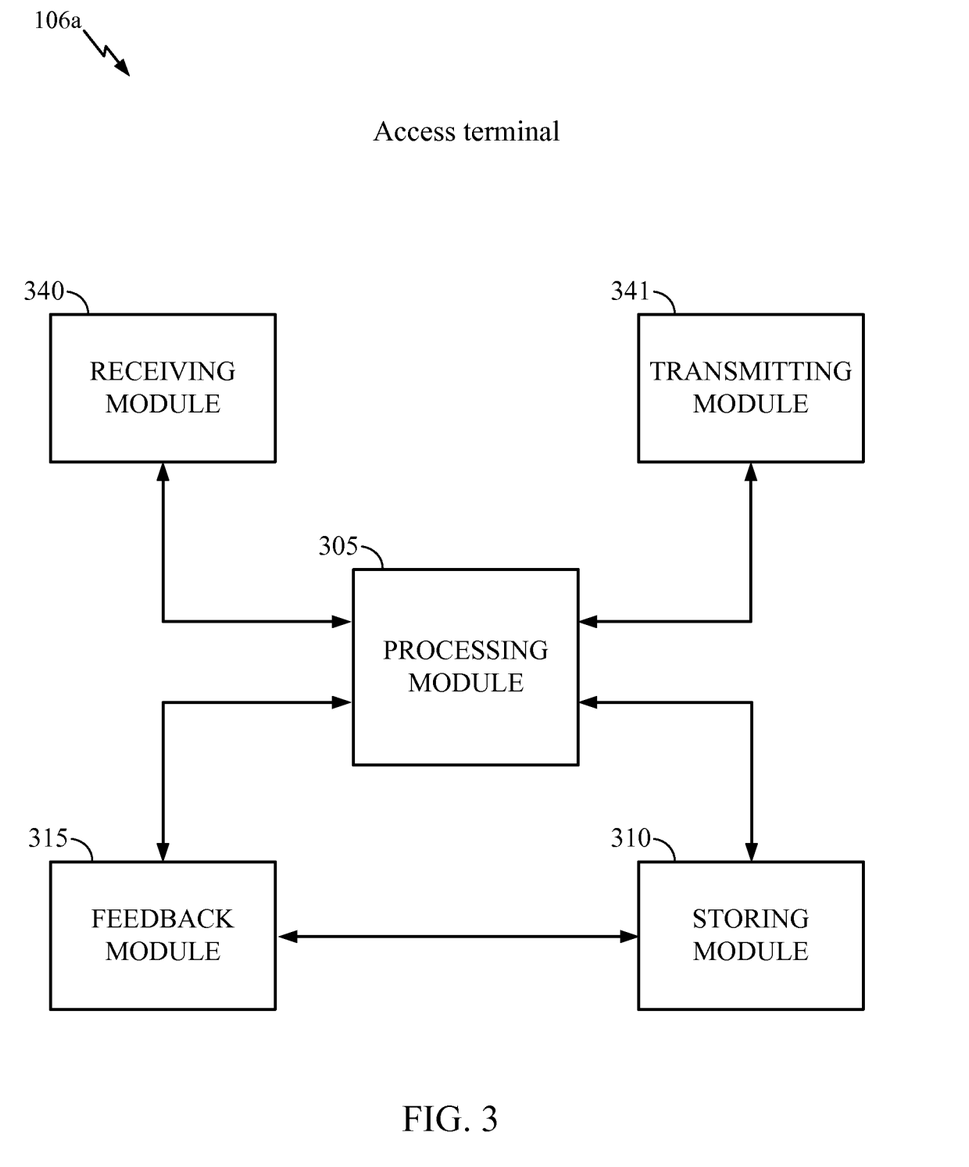
FIG. 3 is a functional block diagram of a second exemplary access terminal of FIG. 1.

FIG. 3 is a functional block diagram of a second exemplary access terminal 106a of FIG. 1. As discussed above, the AT 106a may be a mobile phone. The AT 106a may be used to communicate information to and/or from the node 104a. The AT 106a may comprise a processing module 305 configured to process information for storage, transmission, and/or for the control of other components of the AT 106a. The processing module 305 may further be coupled to a storing module 310. The processing module 305 may read information from or write information to the storing module 310. The storing module 310 may be configured to store information before, during or after processing. In particular, the storing module 310 may be configured to store receive path loss data. The processing module 305 may also be coupled to a receiving module 340 and a transmitting module 341. The receiving module 340 may be configured to receive an inbound wireless message from the AN 104a. The transmitting module 341 may be configured to transmit an outbound wireless message to the AN 104a. The inbound wireless message may be passed to the processing module 305 for processing. The processing module 305 may process the outbound wireless message passing the outbound wireless message to transmitting module 341 for transmission.

The processing module 305 may also be coupled to a feedback module 315. The feedback module 315 may be configured to aggregate information related to path loss of a communication path between the AT 106a and another device (e.g., the node 104a). For example, the feedback module may collect information such as, but not limited to, a number of non-serving down commands of a channel (e.g., an enhanced dedicated channel (E-DCH) such as an E-DCH relative grant channel (E-RGCH)), a percentage of said down commands, downlink path loss differential, aggregate power control bits, and path loss information, wherein path loss information comprises one or more of: received signal code power (RSCP), received signal strength indicator (RSSI), and/or $E_c/I_0$. The feedback module 315 may collect such information by examining signals received at the receiving module 340. The feedback module 315 may forward the aggregated information to the processing module 305. The processing module 305 may process the aggregated information into an outbound wireless message. The processing module may further pass the outbound wireless message to transmitting module 341 for transmission to the AN 104a. In one embodiment, the outbound wireless message may be sent over a carrier comprising one or more common channels.

The receiving module 340 may further be configured to receive from the AN 104a an inbound wireless message configured to allow the receiving module 340 and/or the transmitting module 341 to communicate over a common-channel-free carrier. For example, the message may comprise a code that allows the AT 106a to decode the common-channel-free carrier. The receiving module 340 may pass the received message to the processing module 305. The processing module 305 may process the message and configured the receiving module 340 and/or the transmitting module 341 to communicate over the common-channel-free carrier.

The receiving module 340 and the transmitting module 341 may comprise an antenna and a transceiver. The transceiver may be configured to modulate/demodulate the outbound/inbound wireless messages going to or coming from AN 104a. The outbound/inbound wireless messages may be transmitted/received via the antenna. The antenna may be configured to communicate with the AN 104a over one or more carriers and one ore more channels. The outbound/inbound wireless message may comprise voice and/or data-only information (collectively referred to herein as "data"). The receiving module 340 may demodulate the data received. The receiving module 340 may modulate data to be sent from the AT 106a via to the AN 104a. The processing module 305 and/or the feedback module 315 may provide data to be transmitted.

The storing module 310 may comprise processing module cache, including a multi-level hierarchical cache in which different levels have different capacities and access speeds. The storing module 310 may also comprise random access memory (RAM), other volatile storage devices, or non-volatile storage devices. The storage may include hard drives, optical discs, such as compact discs (CDs) or digital video discs (DVDs), flash memory, floppy discs, magnetic tape, and Zip drives.

Although described separately, it is to be appreciated that functional blocks described with respect to the AT 106a need not be separate structural elements. For example, the processing module 305 and the storing module 310 may be embodied in a single chip. The processing module 305 may additionally, or in the alternative, contain memory, such as registers. Similarly, one or more of the functional blocks or portions of the functionality of various blocks may be embodied in a single chip. Alternatively, the functionality of a particular block may be implemented on two or more chips.

One or more of the functional blocks and/or one or more combinations of the functional blocks described with respect to the AT 106a, such as the processing module 305 and the feedback module 315 may be embodied as a general purpose processor, a digital signal processor (DSP), an application specific integrated circuit (ASIC), a field programmable gate array (FPGA) or other programmable logic device, discrete gate or transistor logic, discrete hardware components, or any suitable combination thereof designed to perform the functions described herein. One or more of the functional blocks and/or one or more combinations of the functional blocks described with respect to the AT 106a may also be implemented as a combination of computing devices, e.g., a combination of a DSP and a microprocessor, a plurality of microprocessors, one or more microprocessors in conjunction with a DSP communication, or any other such configuration.

Figure 4:
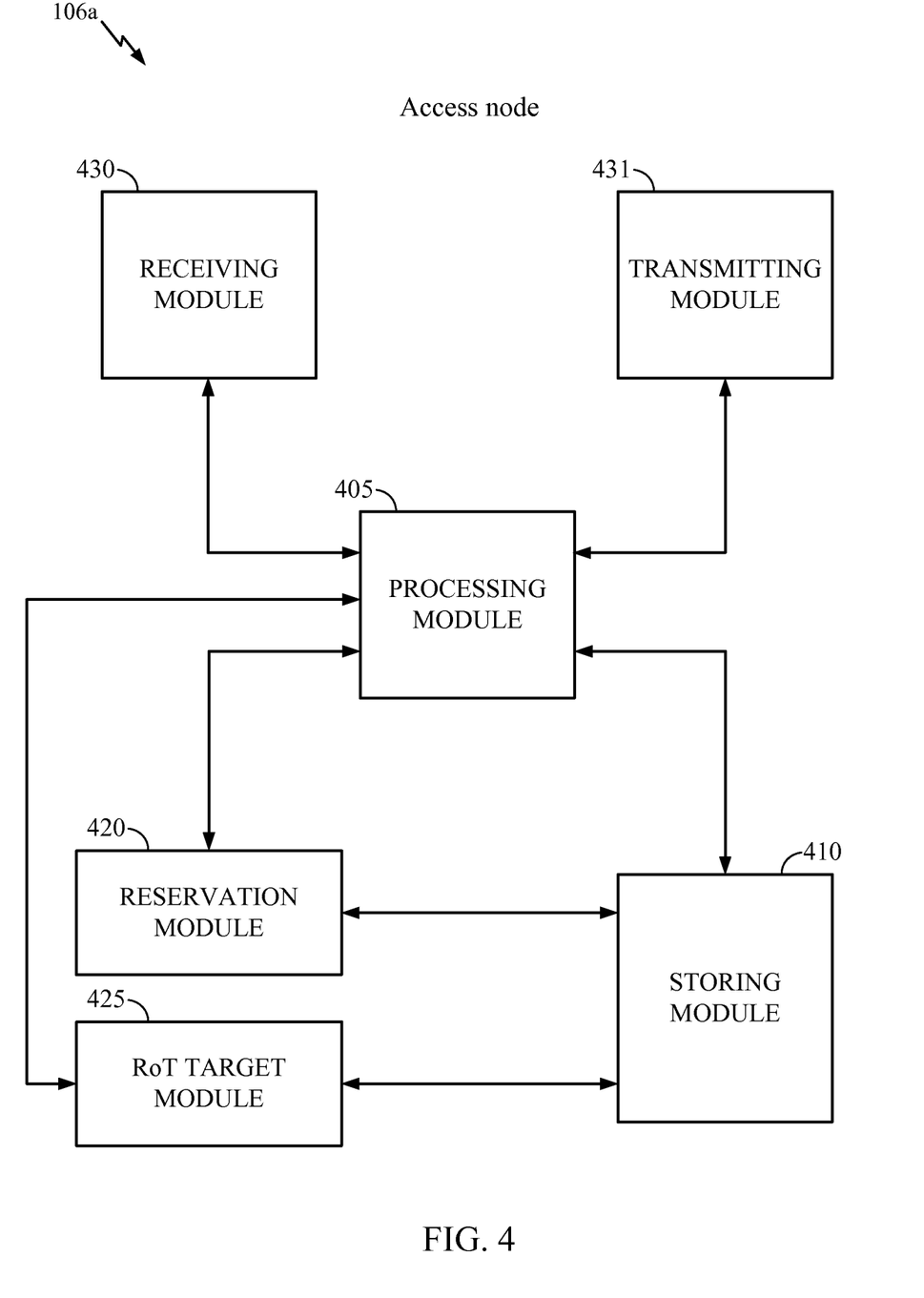
FIG. 4 is a functional block diagram of a second exemplary node of FIG. 1.

FIG. 4 is a functional block diagram of a second exemplary node 104a of FIG. 1. As discussed above, the node 104a communicate with the AT 106a. The node 104a may comprise a receiving module 430 configured to receive an inbound message from the AT 106a and/or other devices. For example, the receiving module 430 may receive a message comprising information related to path loss from the AT 106a. The node 104a may also comprise a transmitting module 431.

The transmitting module 431 may send an outbound message to the AT 106a. For example, the transmitting module 431 may transmit to the AT 106a a message allocating a common-channel-free carrier to the AT 106a. The transmitting module 431 may also send outbound messages to other devices. The receiving module 430 and the transmitting module 431 may be coupled to the processing module 405. The receiving module 430 and the transmitting module 431 may also be configured to pass an outbound message to, and receive an inbound wired message from other nodes in the communication network 100. The receiving module 430 may pass the inbound wired message to the processing module 405 for processing. The processing module 405 may process and pass the wired outbound message to the transmitting module 431 for transmission to the network 100. The processing module 405 may be configured to process the inbound and outbound wireless messages coming from or going to the AT 106a via the receiving module 430 and the transmitting module 431. The processing module 405 may also be configured to control other components of the node 104a.

The processing module 405 may further be coupled, via one or more buses, to a storing module 410. The processing module 405 may read information from or write information to the storing module 410. For example, the storing module 410 may be configured to store inbound our outbound messages before, during, or after processing. In particular, the storing module 510 may be configured to store information related to path loss received from the AT 106a.

The processing module 405 may also be coupled to a reservation module 420. The reservation module 420 may be configured to allocate a common-channel-free carrier to an AT. For example, the reservation module 420 may allocate a common-channel-free carrier to the AT 106a based at least in part upon feedback received from the AT 106a. In one embodiment, the receiving module 430 may receive an inbound wireless message from the AT 106a, the message comprising received path loss information of the communication path between the AN 104a and the AT 106a. In one embodiment, the receive path loss information may comprise a number of non-serving down commands of a channel (e.g., an enhanced dedicated channel (E-DCH) such as an E-DCH relative grant channel (E-RGCH)), a percentage of said down commands, downlink path loss differential, aggregate power control bits, and path loss information, wherein path loss information comprises one or more of: received signal code power (RSCP), received signal strength indicator (RSSI), and/or $E_c/I_0$. The AN 104a may determine whether to allocate the common-channel-free carrier to the AT 106a based at least in part upon the received feedback. For example, if the path loss information indicates that the path loss between the AT 106a and the AN 104a is below a threshold value, the AN 104a may determine to allocate the common-channel-free carrier to the AT 106a. After determining to allocate the common-free-channel, the reservation module 420 may pass information indicative of the determination to the processing module 405. The processing module 405 may process the information indicative of the determination and generate an outbound wireless message configured to allow the AT 106a to decode the common-channel-free carrier. The processing module 405 may further pass the outbound wireless message to transmitting module 431 for transmission to the AT 106a. In one embodiment, the outbound wireless message may be sent over a carrier comprising one or more common channels.

The processing module may further be coupled to a RoT target module 425. The RoT target module 425 may be configured to adapt the RoT target of a carrier (e.g., a common-channel-free carrier or a carrier with a common channel) in real time. For example, the RoT target module 425 may be configured to aggregate information about the communication links between the AN 104a and the ANs communicating with the AN 104a over the carrier. Information about the communication links may include path loss data, SNR, or other communication link parameters. The RoT target module 425 may set the RoT target for the carrier based on the information. In one embodiment, the RoT target module 425 sets different RoT targets for different sectors of the cell 102a for which the AN 104a provides communication coverage. The RoT target of a given sector may be based on information received from ANs within that sector, ANs within other sectors of the cell 102a, and/or ANs in other cells.

The receiving module 430 may receive information about the communication links between the AN 104a and the ANs communicating with the AN 104a over the carrier from the ANs (e.g., the AN 106a) directly. In another embodiment, the receiving module 430 may receive such information from a device on the communication network 100. For example, the receiving module 430 may receive the information about the communication links from a radio network controller (RNC) (not shown) that is part of the communication network 100. The RNC may receive messages from ANs and transmit messages to ANs, such as message originating from and destined for ATs.

In one embodiment, the RoT target module 425 may set the RoT target as follows. For example, if the information about the communication links of the carrier indicates that interference from communications over the carrier in a first sector does not significantly affect communications over the carrier in a second neighboring sector, the RoT target may be increased. If the information indicates that interference from communications over the carrier in a first sector does significantly affect communications over the carrier in a second neighboring sector, the RoT target may be decreased. The change in the RoT target may be a predefined incremental step size. Significance of interference may be based on system stability and/or link budget.

The receiving module 430 and the transmitting module 431 may comprise an antenna and a transceiver. The transceiver may be configured to modulate/demodulate the wireless outbound/inbound messages going to or coming from AT 106a respectively. The wireless outbound/inbound messages may be transmitted/received via the antenna. The antenna may be configured to send and/or receive the outbound/inbound wireless messages to/from the AT 106a over one or more channels. The outbound/inbound messages may comprise voice and/or data-only information (collectively referred to herein as "data"). The receiving module 430 may demodulate the data received. The transmitting module 431 may modulate data to be sent from the node 104a to the AN 106a. The processing module 405 may provide data to be transmitted.

The receiving module 430 and the transmitting module 431 may comprise a modem. The modem may be configured to modulate/demodulate the outbound/inbound wired messages going to or coming from the network 100. The receiving module 430 may demodulate data received. The demodulated data may be transmitted to the processing module 405. The transmitting module 431 may modulate data to be sent from the node 104a. The processing module 405, the reservation module 420, and/or the RoT target module 425 may provide data to be transmitted.

The storing module 410 may comprise processing module cache, including a multi-level hierarchical cache in which different levels have different capacities and access speeds. The storing module 410 may also comprise random access memory (RAM), other volatile storage devices, or non-volatile storage devices. The storage may include hard drives, optical discs, such as compact discs (CDs) or digital video discs (DVDs), flash memory, floppy discs, magnetic tape, and Zip drives.

Although described separately, it is to be appreciated that functional blocks described with respect to the node 104a need not be separate structural elements. For example, the processing module 405 and the storing module 410 may be embodied in a single chip. The processing module 505 may additionally, or in the alternative, contain memory, such as registers. Similarly, one or more of the functional blocks or portions of the functionality of various blocks may be embodied in a single chip. Alternatively, the functionality of a particular block may be implemented on two or more chips.

One or more of the functional blocks and/or one or more combinations of the functional blocks described with respect to the node 104a, such as the processing module 405, the reservation module 420, and the RoT target module 425, may be embodied as a general purpose processor, a digital signal processor (DSP), an application specific integrated circuit (ASIC), a field programmable gate array (FPGA) or other programmable logic device, discrete gate or transistor logic, discrete hardware components, or any suitable combination thereof designed to perform the functions described herein. One or more of the functional blocks and/or one or more combinations of the functional blocks described with respect to the node 104a may also be implemented as a combination of computing devices, e.g., a combination of a DSP and a microprocessor, a plurality of microprocessors, one or more microprocessors in conjunction with a DSP communication, or any other such configuration.

Figure 5:
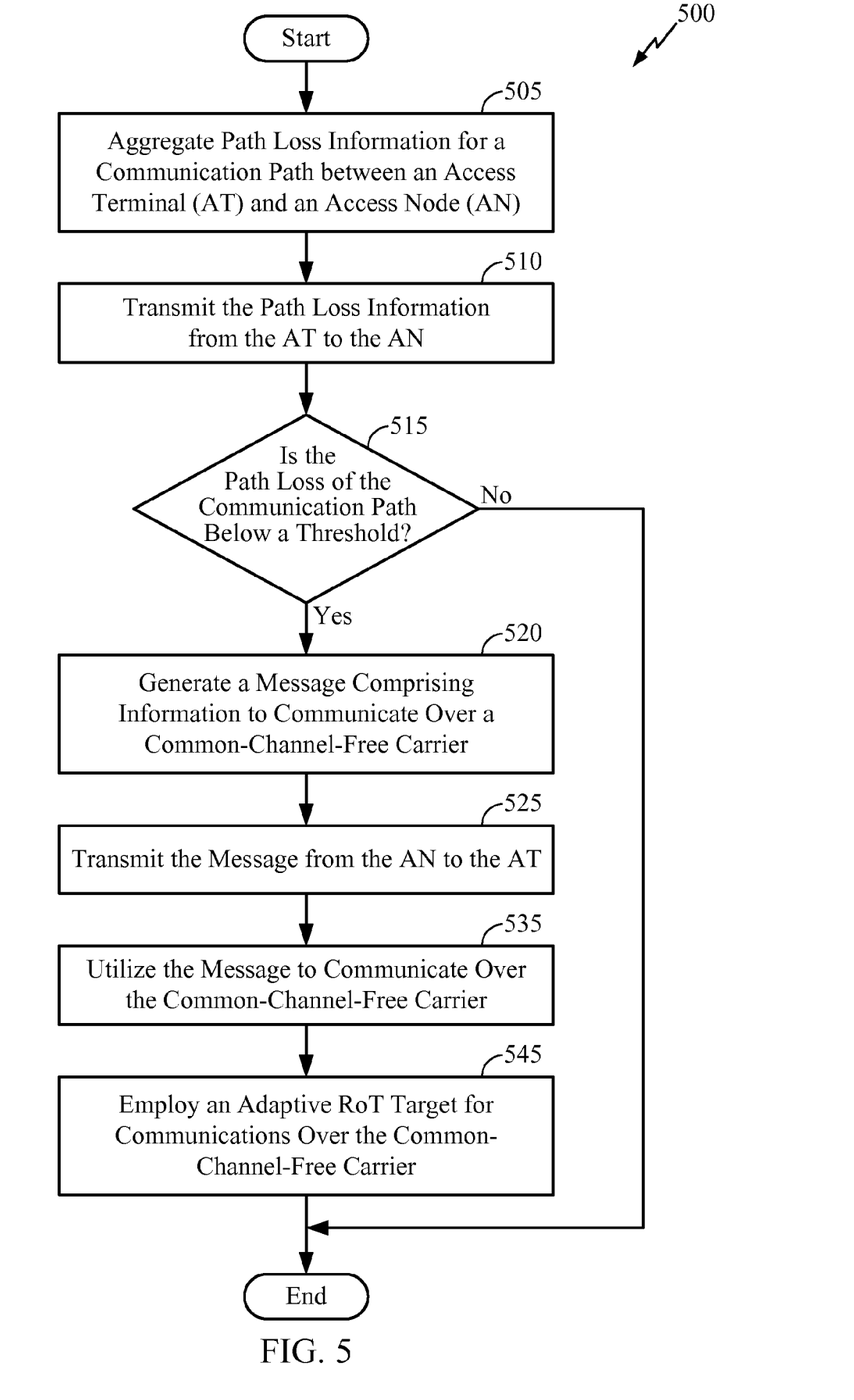
FIG. 5 is a flowchart of an exemplary process of allocating a common-channel-free carrier to an access terminal for communicating with an access node of FIG. 1.

FIG. 5 is a flowchart of an exemplary process of allocating a common-channel-free carrier to the AT 106a for communicating with the AN 104a. At a step 505, the AT 106a aggregates path loss information of the communication path between the AN 104a and the AT 106a. Continuing at a step 510, the AT 106a transmits the path loss information to the AN 104a. Further, at a step 515, the AN 104a determines whether the path loss of the communication path between the AN 104a and the AT 106a is below a threshold level based at least in part on the path loss information received. If the AN 104a determines the path loss is not below the threshold level the process 500 ends. If the AN 104a determine the path loss is below the threshold level, the process 500 continues to a step 520. At the step 520, the AN 104a generates a message comprising information configured to allow the AT 106a to communicate over the common-channel-free carrier. Further, at the step 525, the AN 104a transmits the generated message to the AT 106a. Next, at the step 535, the AT 106a utilizes the information of the received message to communicate over the common-channel-free carrier. Continuing at an optional step 540, the AN 104a may employ an adaptive RoT target for communicating with ATs, such as the AT 106a, over the common-channel-free carrier.

Figure 6:
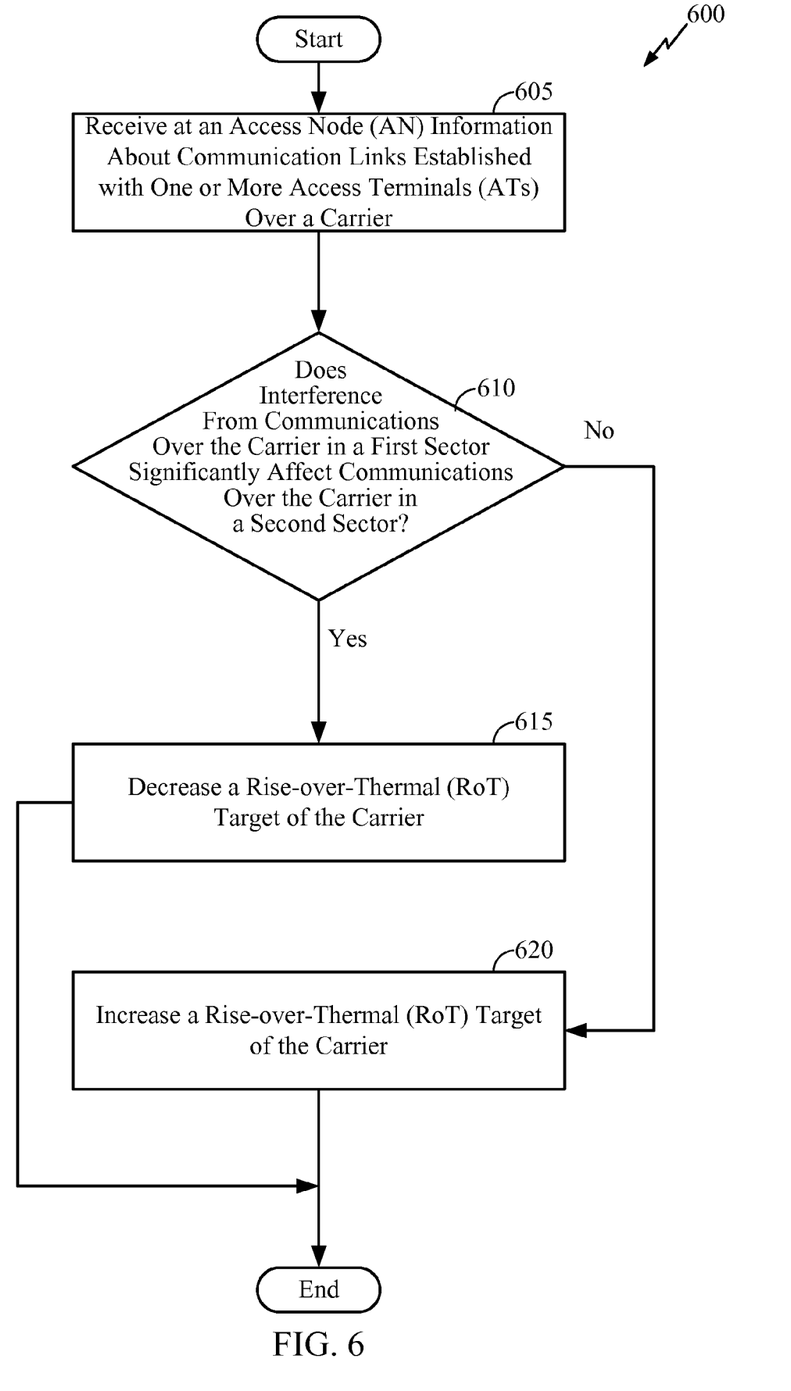
FIG. 6 is a flowchart of an exemplary process of adapting the rise-over-thermal (RoT) target of a carrier over which an access terminal communicates with an access node of FIG. 1.

FIG. 6 is a flowchart of an exemplary process of adapting the RoT target of a carrier over which the AT 106a communicates with the AN 104a. At a step 605, the AN 104a may receive information (e.g., path loss data, SNR, or other communication link parameters) about communication links established with one or more ATs (e.g., AT 106a). The communication links may all be established over a carrier (e.g., a common-channel-free carrier or a carrier with a common channel). In one embodiment, the AN 104a receives the information from the ATs directly. In another embodiment, the AT 104a receives the information from an RNC.

Continuing at a step 610, the AN 104a determines whether interference from communications over the carrier in a first sector significantly affects communications over the carrier in a second neighboring sector. If the AN 104a determines interference from communications over the carrier in a first sector significantly affects communications over the carrier in a second neighboring sector, the process continues to step 615, where the RoT target of the carrier is decreased and the process 600 ends. If the AN 104a determines interference from communications over the carrier in a first sector does not significantly affect communications over the carrier in a second neighboring sector, the process continues to step 620, where the RoT target of the carrier is increased and the process 600 ends.

The functionality of the modules of FIGS. 2-4 may be implemented in various ways consistent with the teachings herein. In some aspects the functionality of these modules may be implemented as one or more electrical components. In some aspects the functionality of these blocks may be implemented as a processing system including one or more processor components. In some aspects the functionality of these modules may be implemented using, for example, at least a portion of one or more integrated circuits (e.g., an ASIC). As discussed herein, an integrated circuit may include a processor, software, other related components, or some combination thereof. The functionality of these modules also may be implemented in some other manner as taught herein.

The functionality described herein (e.g., with regard to one or more of the accompanying figures) may correspond in some aspects to similarly designated "means for" functionality in the appended claims. Referring to FIGS. 2-4, the node 104a and the AT 106a are represented as a series of interrelated functional modules.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements. In addition, terminology of the form "at least one of: A, B, or C" used in the description or the claims means "A or B or C or any combination of these elements."

Those skilled in the art will understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those skilled in the art will further appreciate that the various illustrative logical blocks, modules, circuits, methods and algorithms described in connection with the examples disclosed herein may be implemented as electronic hardware, computer software, or combinations of both. To clearly illustrate this interchangeability of hardware and software, various illustrative components, blocks, modules, circuits, methods and algorithms have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the examples disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP communication, or any other such configuration.

The methods or algorithms described in connection with the examples disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor may read information from, and write information to, the storage medium. In the alternative, the storage medium may be integral to the processor. The processor and the storage medium may reside in an ASIC.

In one or more exemplary embodiments, the functions described may be implemented in hardware, software, firmware, or any combination thereof. If implemented in software, the functions may be stored as one or more instructions or code on a computer-readable medium. Computer-readable media includes computer storage media that facilitates transfer of a computer program from one place to another. A storage media may be any available media that can be accessed by a general purpose or special purpose computer. By way of example, and not limitation, such computer-readable media may comprise RAM, ROM, EEPROM, CD-ROM or other optical disk storage, magnetic disk storage or other magnetic storage devices, or any other medium that may be used to carry or store desired program code means in the form of instructions or data structures and that can be accessed by a general-purpose or special-purpose computer, or a general-purpose or special-purpose processor. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Further, if implemented in software, the functions may be transmitted as one or more instructions or code over a transmission medium. A transmission medium may be any available connection for transmitting the one or more instructions or code. For example, if the software is transmitted from a website, server, or other remote source using a coaxial cable, fiber optic cable, twisted pair, digital subscriber line (DSL), then the coaxial cable, fiber optic cable, twisted pair, DSL, are included in the definition of transmission medium.

The previous description of the disclosed examples is provided to enable any person skilled in the art to make or use the present invention. Various modifications to these examples will be readily apparent to those skilled in the art, and the generic principles defined herein may be applied to other examples without departing from the spirit or scope of the invention. Thus, the present invention is not intended to be limited to the examples shown herein but is to be accorded the widest scope consistent with the principles and novel features disclosed herein.

What is claimed is:

1. A wireless communication apparatus operative in a communication network, the apparatus comprising:
   a transceiver configured to communicate with a plurality of communication devices over at least one carrier;
   a processor configured to determine if path loss information indicates that the path loss between the transceiver and at least one of the plurality of communication devices is below a threshold value; and
   wherein the processor is further configured to employ an adaptive rise-over-thermal (RoT) target for communication between the transceiver and at least one of the plurality of communication devices over the at least one carrier, based on the path loss information for other communication devices not including the at least one of the plurality of communication devices, wherein the adaptive RoT target is updated in real time.

2. The apparatus of claim 1, wherein the adaptive RoT target is based at least in part on a geographical region where the at least one of the plurality of communication devices is located.

3. The apparatus of claim 1, wherein the transceiver is further configured to receive an indication of interference from another wireless communication apparatus, and wherein the adaptive RoT target is based at least in part on the indication of interference.

4. The apparatus of claim 1, wherein the carrier is reserved for high speed data transmission, wherein the carrier is free of a common channel, further wherein the carrier is an uplink carrier and a downlink carrier, and wherein the path loss information comprises at least one information type selected from the group consisting of a number of non-serving down commands, a percentage of said down commands, downlink path loss differential, and aggregate power control bits.

5. A method for communicating in a communication network, the method comprising:
   determining if path loss information indicates that the path loss between the transceiver and at least one of the plurality of communication devices is below a threshold value;
   communicating with a plurality of communication devices over at least one carrier; and
   employing an adaptive rise-over-thermal (RoT) target for communication with at least one of the plurality of communication devices over the at least one carrier, based on the path loss information for other communication devices not including the at least one of the plurality of communication devices, wherein the adaptive RoT target is updated in real time.

6. The method of claim 5, wherein the adaptive RoT target is based at least in part on a geographical region where the at least one of the plurality of communication devices is located.

7. The method of claim 5, further comprising receiving an indication of interference from another wireless communication apparatus, and wherein the adaptive RoT target is based at least in part on the indication of interference.

8. The method of claim 5, wherein the carrier is reserved for high speed data transmission, wherein the carrier is free of a common channel, further wherein the carrier is an uplink carrier and a downlink carrier, and wherein the path loss information comprises at least one information type selected from the group consisting of a number of non-serving down commands, a percentage of said down commands, downlink path loss differential, and aggregate power control bits.

9. A wireless communication apparatus operative in a communication network, the apparatus comprising:
- means for determining whether path loss information indicates that the path loss between the transceiver and at least one of the plurality of communication devices is below a threshold value;
- means for communicating with a plurality of communication devices over at least one carrier; and
- means for employing an adaptive rise-over-thermal (RoT) target for communication between the communicating means and at least one of the plurality of communication devices over the at least one carrier, based on the path loss information for other communication devices not including the at least one of the plurality of communication devices, wherein the adaptive RoT target is updated in real time.

10. The apparatus of claim 9, wherein the adaptive RoT target is based at least in part on a geographical region where the at least one of the plurality of communication devices is located.

11. The apparatus of claim 9, wherein the communicating means is further configured to receive an indication of interference from another wireless communication apparatus, and wherein the adaptive RoT target is based at least in part on the indication of interference.

12. The apparatus of claim 9, wherein the carrier is reserved for high speed data transmission, wherein the carrier is free of a common channel, further wherein the carrier is an uplink carrier and a downlink carrier, and wherein the path loss information comprises at least one information type selected from the group consisting of a number of non-serving down commands, a percentage of said down commands, downlink path loss differential, and aggregate power control bits.

13. A non-transitory computer-readable medium comprising:
- code for causing a computer to determine if path loss information indicates that the path loss between the transceiver and at least one of the plurality of communication devices is below a threshold value;
- code for causing a computer to communicate with a plurality of communication devices over at least one carrier; and
- code for causing a computer to employ an adaptive rise-over-thermal (RoT) target for communication with at least one of the plurality of communication devices over the at least one carrier, based on the path loss information for other communication devices not including the at least one of the plurality of communication devices, wherein the adaptive RoT target is updated in real time.

14. The non-transitory computer-readable medium of claim 13, wherein the adaptive RoT target is based at least in part on a geographical region where the at least one of the plurality of communication devices is located.

15. The non-transitory computer-readable medium of claim 13, wherein the computer-readable medium further comprises code for causing a computer to receive an indication of interference from another wireless communication apparatus, and wherein the adaptive RoT target is based at least in part on the indication of interference.

16. The non-transitory computer-readable medium of claim 13, wherein the carrier is reserved for high speed data transmission, wherein the carrier is free of a common channel, further wherein the carrier is an uplink carrier and a downlink carrier, and wherein the path loss information comprises at least one information type selected from the group consisting of a number of non-serving down commands, a percentage of said down commands, downlink path loss differential, and aggregate power control bits.

17. The non-transitory computer-readable medium of claim 13, wherein the carrier is free of a broadcast channel.

18. The method of claim 5, wherein the adaptive RoT target is updated in real-time based on a number of the plurality of communication devices currently allocated to the at least one carrier.

19. The method of claim 5, further comprising:
- allocating one or more of the plurality of communication devices to a common-channel-free carrier; and
- employing a higher adaptive RoT target than would otherwise be employed if the one or more of the plurality of communication devices were not allocated to the common-channel-free carrier.

20. The method of claim 5, wherein the adaptive RoT target is updated in real-time based on an amount of interference from communications over the at least one carrier.

21. The method of claim 20, wherein the amount of interference is determined based at least in part on communication link parameters of the at least one carrier.

22. The method of claim 5, wherein different adaptive RoT targets are set for different sectors of a cell served by the at least one carrier.

23. The method of claim 5, wherein an update in the adaptive RoT target is in a predefined incremental step size.

24. The method of claim 5, wherein updating the adaptive RoT target in real time permits a data rate for the communication with the at least one of the plurality of communication devices over the at least one carrier to be adjusted to a highest possible value at any given time.

* * * * *